United States Patent
Girault et al.

(10) Patent No.: US 9,672,197 B2
(45) Date of Patent: Jun. 6, 2017

(54) UNIVERSAL REBRANDING ENGINE

(71) Applicant: SUGARCRM Inc., Cupertino, CA (US)

(72) Inventors: Julien Girault, Sunnyvale, CA (US); Matthew Marum, Cary, NC (US); Henry Rogers, Raleigh, NC (US)

(73) Assignee: SugarCRM Inc., Cupertino, CA (US)

( * ) Notice: Subject to any disclaimer, the term of this patent is extended or adjusted under 35 U.S.C. 154(b) by 232 days.

(21) Appl. No.: 14/514,005

(22) Filed: Oct. 14, 2014

(65) Prior Publication Data

US 2016/0103800 A1   Apr. 14, 2016

(51) Int. Cl.
  *G06F 17/22* (2006.01)
  *G06F 17/27* (2006.01)
(52) U.S. Cl.
  CPC ........ *G06F 17/2247* (2013.01); *G06F 17/272* (2013.01); *G06F 17/2785* (2013.01)
(58) Field of Classification Search
  CPC .............. G06F 17/2247; G06F 17/227; G06F 17/30905
  See application file for complete search history.

(56) References Cited

U.S. PATENT DOCUMENTS

| 2003/0217076 | A1* | 11/2003 | Heptinstall | G06F 17/30905 |
| 2008/0250310 | A1* | 10/2008 | Chen | G06F 17/2247 715/234 |
| 2013/0132389 | A1* | 5/2013 | Majidian | G06F 17/30622 707/736 |
| 2014/0136506 | A1* | 5/2014 | Ratner | G06F 17/30864 707/706 |
| 2014/0282453 | A1* | 9/2014 | O'Rourke | G06F 8/41 717/154 |
| 2015/0081681 | A1* | 3/2015 | Vohra | G06F 17/30705 707/723 |
| 2015/0193117 | A1* | 7/2015 | Nicolaou | G06F 17/30884 715/208 |

OTHER PUBLICATIONS

Microsoft Expression "Customizing a Website Template with Expression Web" as available Mar. 7, 2013, pp. 1-6 http://msdn.microsoft.com/en-us/expression/dd939172.aspx.*

* cited by examiner

*Primary Examiner* — Scott Baderman
*Assistant Examiner* — Mario M Velez-Lopez
(74) *Attorney, Agent, or Firm* — Steven M. Greenberg, Esq.; CRGO Law

(57) ABSTRACT

Embodiments of the invention provide for universal rebranding of a Web site. A method for Web site universal rebranding includes loading source code for a source Web site and source code for a target Web site. The method also includes parsing the source code to identify for each of the source Web site and the target Web site a style sheet framework, one or more icons representative of branded logos, and a color and font scheme. Thereafter, design ontologies for both the source and also the target Web site are generated based upon the respectively identified style sheet frameworks, icons, logos and color and font schemes. Finally, the ontologies can be compared to identify common design elements and the style sheet framework of the target Web site can be modified to incorporate design values for the common design elements drawn from the style sheet of the source Web site.

12 Claims, 1 Drawing Sheet

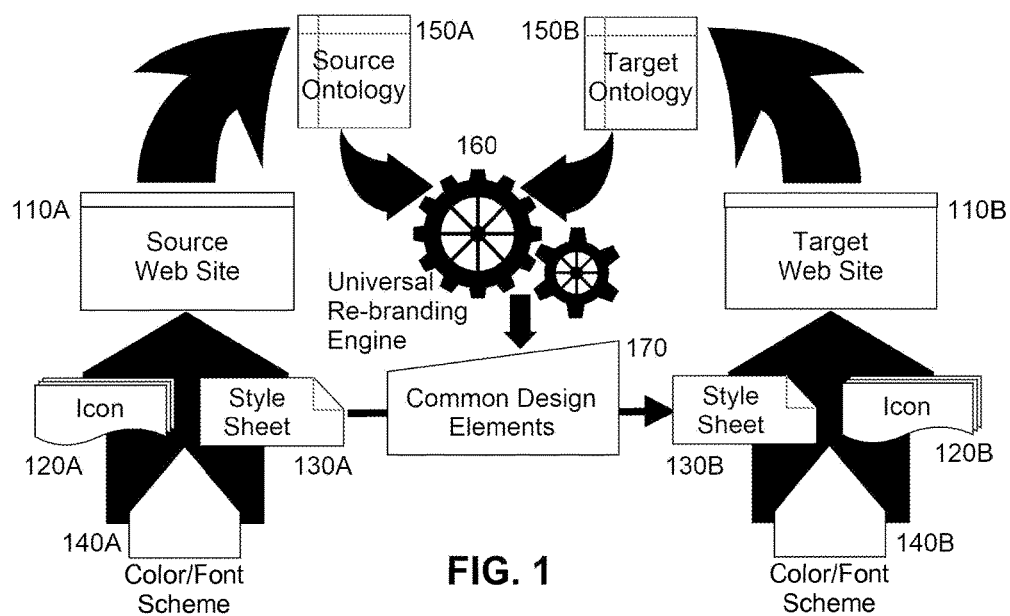
FIG. 1
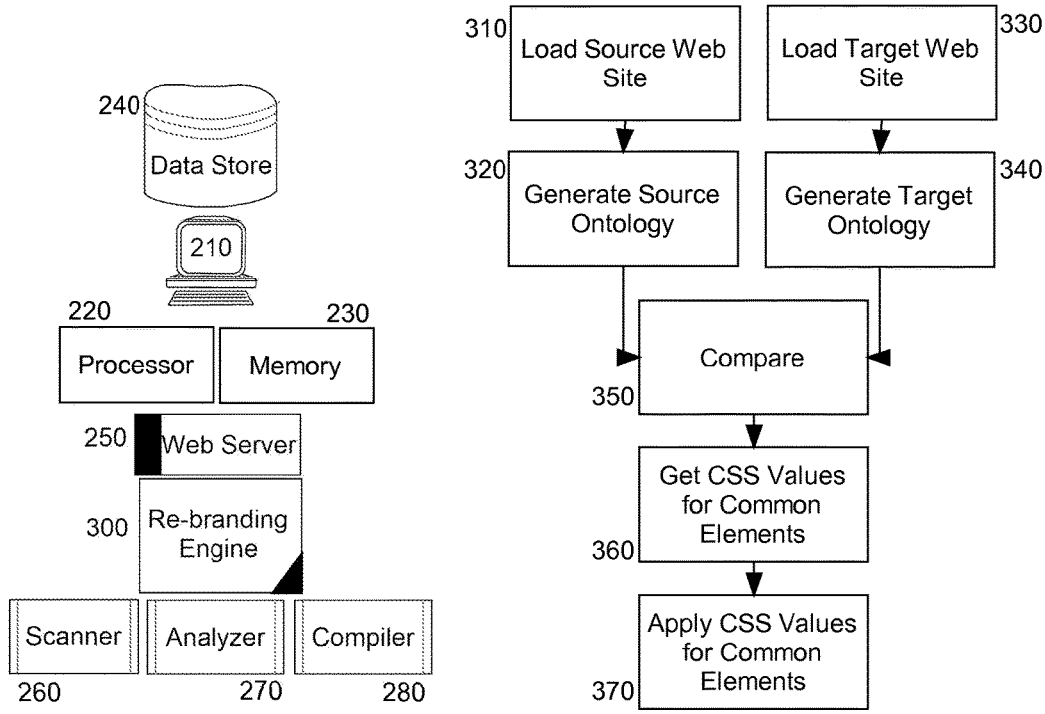
FIG. 2
FIG. 3

UNIVERSAL REBRANDING ENGINE

BACKGROUND OF THE INVENTION

Field of the Invention

The present invention relates to Web site design and more particularly to automated Web site redesign.

Description of the Related Art

The presentation of a Web site has evolved from a simple document inclusive of text or imagery or a combination or thereof, to a multi-layered navigable collection of user interface elements both statically defined and dynamically determined. Whereas in the past, the arrangement and decoration of Web page elements had been statically encoded in the Web page itself, more complex Web pages now are formatted "on the fly" through the use of external directives. In this way, the look and feel of a Web page can vary while the content itself can remain unchanged. A popular technology used in this regard is the cascading style sheet ("CSS").

CSS is a style sheet language used for describing the look and feel of a document written in a markup language such as the hypertext markup language ("HTML"). More particularly, a CSS document can be specified once so as to set forth the look and feel of multiple different Web pages. As such, CSS has become a cornerstone specification of the World Wide Web in that almost all Web pages use CSS style sheets to describe their presentation.

CSS particularly enables the separation of Web page content from Web page presentation, including elements such as the layout, colors, and fonts. This separation can improve content accessibility, provide more flexibility and control in the specification of presentation characteristics, enable multiple pages to share formatting, and reduce complexity and repetition in the structural content. Thus CSS obviates those portions of markup that would specify presentation by instead providing that information in a separate file.

In a CSS document, formatting instructions are provided for each relevant markup language element identified by a corresponding tag. Further, the CSS document may specify a priority scheme to determine which style rules apply if more than one rule matches against a particular element of a Web page. Consequently, no formatting markup need be disposed within the Web page itself as the CSS document will determine the formatting of the content based upon the application of rules driven by the cascading priorities of the priority scheme.

Of note, CSS technology can be used to "brand" a complete Web site. In this regard, a CSS document can be defined so as to capture the intended look and feel of the desired brand, complete with logo and other relevant imagery. However, to re-brand a different Web site to match that of an existing Web site, uniformity between Web sites is required. Otherwise, the design elements of the existing Web site as referenced in the CSS document will not bear a uniform relationship to the design elements of the different Web site and the CSS document cannot be applied to the different Web site to effectuate an automated rebranding of the different Web site. Instead, rebranding of the different Web site to match that of the existing Web site requires the manual determination of the formatting of the existing Web site and the manual specification of a new CSS document to incorporate the manually determined formatting before applying the new CSS document to the different Web site.

BRIEF SUMMARY OF THE INVENTION

Embodiments of the present invention address deficiencies of the art in respect to Web site rebranding and provide a novel and non-obvious method, system and computer program product for universal rebranding. In an embodiment of the invention, a method for universal rebranding of a Web site includes loading into memory of a computer source code for a source Web site and source code for a target Web site. The method also includes parsing the source code by a processor of the computer to identify for each of the source Web site and the target Web site a style sheet framework, one or more icons representative of branded logos, and a color and font scheme. Thereafter, both a source design ontology for the source Web site and also a target design ontology for the target Web site are generated based upon the respectively identified style sheet frameworks, icons, logos and color and font schemes. Finally, the generated design ontologies can be compared to identify common design elements and the style sheet framework of the target Web site can be modified to incorporate design values for the common design elements drawn from the style sheet of the source Web site.

In another embodiment of the invention, a Web site development data processing system is configured for universal rebranding of a Web site. The system includes a computer with memory and at least one processor. The system also includes a universal rebranding engine executing in the memory of the computer. The engine includes program code enabled by execution by the processor to load into the memory source code for a source Web site and source code for a target Web site, to parse the source code to identify for each of the source Web site and the target Web site a style sheet framework, one or more icons representative of branded logos, and a color and font scheme, to generate a source design ontology for the source Web site based upon the identified style sheet framework, icons, logos and color and font scheme for the source Web site, and a target design ontology for the target Web site based upon the identified style sheet framework, icons, logos and color and font scheme for the target Web site, to compare the design ontologies to identify common design elements and to modify the style sheet framework of the target Web site to incorporate design values for the common design elements drawn from the style sheet of the source Web site.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a process for universal rebranding of a Web site;

FIG. 2 is a schematic illustration of a Web site development data processing system configured for universal rebranding; and, FIG. 3 is a flow chart illustrating a process for universal rebranding.

DETAILED DESCRIPTION OF THE INVENTION

Embodiments of the invention provide for universal rebranding. In accordance with an embodiment of the invention, source documents of a source Web site can be loaded into memory and parsed to identify a stylesheet framework for the source Web site, one or more icons representative of branded logos of the source Web site, and a color and font scheme for the source Web site. A design ontology then can be constructed based upon the identified stylesheet framework, icons, logos and color and font scheme. Thereafter, a target Web site can be loaded into memory and parsed as before to produce a design ontology of the target Web site. The two design ontologies then can be compared and commons design elements of the design ontologies can be identified. As such, the stylesheet of the target Web site can be modified to incorporate design values for those of the common design elements drawn from the stylesheet of the source Web site. In this way, the target Web site can be rebranded in accordance with the source Web site despite difference in structure and content as between both Web sites.

In further illustration, Figure pictorially shows a process for universal rebranding of a Web site. As shown in FIG. 1, a source Web site 110A can be analyzed by a universal re-branding engine 160 to identify each of one or more icons 120A disposed within the source Web site 110A. The analysis by the universal re-branding engine 160 also can identify within the source Web site 110A a style sheet framework 130A such as a CSS conforming style sheet, and a color and font scheme 140A for the source Web site 110A. Based thereon, the universal re-branding engine 160 can generate a source design ontology 150A of the source Web site 110A describing the various design elements of the source Web site 110A including the identified icons 120A, the style sheet framework 130A and the color and font scheme 140A.

Thereafter, the universal re-branding engine 160 also can analyze a target Web site 110B to identify each of one or more icons 120B disposed within the target Web site 110B. The analysis by the universal re-branding engine 160 also can identify within the target Web site 110B a style sheet framework 130B such as a CSS conforming style sheet, and a color and font scheme 140B for the target Web site 110B. Based thereon, the universal re-branding engine 160 can generate a target design ontology 150B of the target Web site 110B describing the various design elements of the target Web site 110B including the identified icons 120B, the style sheet framework 130B and the color and font scheme 140B.

Once both the source design ontology 150A and the target design ontology 150B have been generated, the universal re-branding engine 160 can compare the ontologies 150A, 150B in order to determine design elements 170 common to both the source Web site 110A and the target Web site 110B. Thereafter, the universal re-branding engine 160 can replace the style sheet presentation values in the style sheet 130B for the common design elements 170 with corresponding style sheet presentation values in the style sheet 130A. Further, the icons 120B of the target Web site 110B corresponding to the common design elements 170 can be replaced with corresponding ones of the icons 120A. Finally, portions of the color and font scheme 140A of the target Web site 110B corresponding to the common design elements 170 can be replaced with corresponding portions of the color and font scheme 140A of the source Web site 110A.

The process described in connection with FIG. 1 can be implemented within a Web site development data processing system. In yet further illustration, FIG. 2 schematically shows a Web site development data processing system configured for universal rebranding. The system includes a host computing system 210 with at least one processor 220 and memory 230. A data store 240 can be coupled to the host computing system 210 and can store therein source code for both a source Web site and a target Web site. A Web server 250 can execute in the host computing system 210 and can be enabled to serve different Web pages of the source and target Web sites to requesting end users.

Of note, a re-branding engine 300 can execute in the memory 230 of the host computing system 210. The re-branding engine 300 can include three different discrete modules: a scanner 260, an analyzer 270 and a compiler 280. The scanner 260 can be enabled to generate each of a source design ontology and a target design ontology for the source Web site and the target Web site. The analyzer 270 in turn can be enabled to compare the generated source design ontology with the generated target design ontology so as to identify design elements common to both ontologies. Optionally, the analyzer 270 can display in a graphical user interface the common design elements for validation by an end user. Finally, the compiler 280 can process the common design elements so as to apply values in the style sheet of the style sheet framework of the source Web site for common design elements to corresponding elements in the style sheet framework of the target Web site. The compiler 280 also can package icons of the source Web site for use in the target Web site. Finally, the compiler 280 can present documentation in respect to the re-branding of the target Web site.

In even yet further illustration of the operation of the re-branding engine, FIG. 3 is a flow chart illustrating a process for universal rebranding. Beginning in block 310, source code such as one or more documents can be loaded for a source Web site. In block 320, a source design ontology can be generated for the source code of the source Web site, so as to include a style sheet framework, one or more icons and a color and font scheme for the elements of the source Web site Likewise, in block 330 source code for a target Web site can be loaded and a target design ontology can be generated for the source code of the target Web site. Thereafter, in block 350 the ontologies can be compared so as to identify common design elements. In block 360, the style sheet values for common design elements can be determined in the style sheet framework of the source design ontology. Finally, in block 370 the determined style sheet values can be applied to the style sheet framework of the target Web site.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following:

a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method for universal rebranding of a Web site, the method comprising:
   loading into memory of a computer source code for a source Web site and source code for a target Web site;
   parsing the source code by a processor of the computer to identify for each of the source Web site and the target Web site a style sheet framework, one or more icons representative of branded logos, and a color and font scheme;
   generating a source design ontology for the source Web site based upon the identified style sheet framework, icons, logos and color and font scheme for the source Web site, and a target design ontology for the target Web site based upon the identified style sheet framework, icons, logos and color and font scheme for the target Web site;
   comparing the design ontologies to identify common design elements; and,
   modifying the style sheet framework of the target Web site to incorporate design values for the common design elements drawn from the style sheet of the source Web site.

2. The method of claim 1, wherein the style sheet frameworks of each of the source Web site and target Web site conforms to the cascading style sheet ("CSS") language.

3. The method of claim 1, wherein icons comprise a logo.

4. The method of claim 1, further comprising displaying a report incorporating design elements of the source design ontology that are not present in the target design ontology.

5. A Web site development data processing system configured for universal rebranding of a Web site, the system comprising:
   a computer with memory and at least one processor; and,
   a universal rebranding engine executing in the memory of the computer, the engine comprising program code enabled by execution by the processor to load into the memory source code for a source Web site and source code for a target Web site, to parse the source code to identify for each of the source Web site and the target Web site a style sheet framework, one or more icons representative of branded logos, and a color and font scheme, to generate a source design ontology for the source Web site based upon the identified style sheet framework, icons, logos and color and font scheme for the source Web site, and a target design ontology for the target Web site based upon the identified style sheet framework, icons, logos and color and font scheme for the target Web site, to compare the design ontologies to identify common design elements and to modify the style sheet framework of the target Web site to incorporate design values for the common design elements drawn from the style sheet of the source Web site.

6. The system of claim 5, wherein the style sheet frameworks of each of the source Web site and target Web site conforms to the cascading style sheet ("CSS") language.

7. The system of claim 5, wherein icons comprise a logo.

8. The system of claim 5, wherein the program code is further enabled to display a report incorporating design elements of the source design ontology that are not present in the target design ontology.

9. A computer program product for universal rebranding of a Web site, the computer program product comprising a computer readable storage medium having program instructions embodied therewith, the program instructions executable by a device to cause the device to perform a method comprising:
   loading by the device source code for a source Web site and source code for a target Web site;
   parsing by the device the source code by a processor of the computer to identify for each of the source Web site and the target Web site a style sheet framework, one or more icons representative of branded logos, and a color and font scheme;
   generating by the device a source design ontology for the source Web site based upon the identified style sheet framework, icons, logos and color and font scheme for the source Web site, and a target design ontology for the target Web site based upon the identified style sheet framework, icons, logos and color and font scheme for the target Web site;
   comparing by the device the design ontologies to identify common design elements; and,
   modifying by the device the style sheet framework of the target Web site to incorporate design values for the common design elements drawn from the style sheet of the source Web site.

10. The computer program product of claim 9, wherein the style sheet frameworks of each of the source Web site and target Web site conforms to the cascading style sheet ("CSS") language.

11. The computer program product of claim 9, wherein icons comprise a logo.

12. The computer program product of claim 9, wherein the device causes the displaying of a report incorporating design elements of the source design ontology that are not present in the target design ontology.

* * * * *